US008106930B2

(12) United States Patent
Wang et al.

(10) Patent No.: US 8,106,930 B2
(45) Date of Patent: Jan. 31, 2012

(54) IMAGE DISPLAY SYSTEM AND METHOD FOR ELIMINATING MURA DEFECTS

(75) Inventors: Shou-Cheng Wang, Jhubei (TW); Du-Zen Peng, Jhubei (TW)

(73) Assignee: Chimei Innolux Corporation, Miao-Li County (TW)

( * ) Notice: Subject to any disclaimer, the term of this patent is extended or adjusted under 35 U.S.C. 154(b) by 941 days.

(21) Appl. No.: 12/113,486

(22) Filed: May 1, 2008

(65) Prior Publication Data

US 2008/0284794 A1 Nov. 20, 2008

(30) Foreign Application Priority Data

May 17, 2007 (TW) .............................. 96117555 A

(51) Int. Cl.
*G09G 5/02* (2006.01)
*G09G 5/00* (2006.01)
*G06F 3/038* (2006.01)

(52) U.S. Cl. ....................................... 345/697; 345/207

(58) Field of Classification Search ................... 345/697
See application file for complete search history.

(56) References Cited

U.S. PATENT DOCUMENTS 5,793,344 A * 8/1998 Koyama .......................... 345/87
6,771,839 B2 * 8/2004 Westerman ................... 382/274
6,911,781 B2 6/2005 Yamazaki et al.
7,737,937 B2 * 6/2010 Fisekovic et al. ............. 345/102
2008/0238934 A1 * 10/2008 Daly et al. .................... 345/617

FOREIGN PATENT DOCUMENTS

CN 1373612 A 10/2002
CN 1538374 A 10/2004
CN 1655015 A 8/2005
CN 1809859 A 7/2006

* cited by examiner

*Primary Examiner* — Kee M Tung
*Assistant Examiner* — Carlos Perromat
(74) *Attorney, Agent, or Firm* — Morris Manning & Martin LLP; Tim Tingkang Xia, Esq.

(57) ABSTRACT

Image display techniques for eliminating mura defects, which collects reference data and adjusts the gray levels. The image display systems comprising a plurality of pixels, a memory, and an ASIC. Each of the pixels relates to a mura compensation coefficient set. The mura compensation coefficient sets of the pixels are generated by a coefficient generator. The memory stores the mura compensation coefficient sets of the pixels. The ASIC reads the mura compensation coefficient sets from the memory. With different mura compensation coefficient sets, the ASIC serves as different mura compensation function sets. Each mura compensation function set relates to one of the aforementioned pixels and is used for transforming an original gray level to a mura-eliminated gray level to drive the corresponding pixel.

24 Claims, 11 Drawing Sheets

IMAGE DISPLAY SYSTEM AND METHOD FOR ELIMINATING MURA DEFECTS

BACKGROUND OF THE INVENTION

1. Field of the Invention

The present invention relates to image display systems and methods of eliminating mura defects.

2. Description of the Related Art

Each pixel comprises at least one thin film transistor (TFT). To drive the pixel, the corresponding TFT has to be turned on to transmit signals. The brightness of each pixel is dependent on the electronic characteristics of the corresponding TFT. Any deviation during the semiconductor process affects the electronic characteristics of the TFTs, thus, it is unusually for TFTs to have identical electronic characteristics and so different pixels generate different brightness although they are driven by the same gray level. The uneven brightness of the pixels is named mura defect.

One conventional solution to mura defect is to add mura compensation devices into the circuits of the pixels. The mura compensation device can be a voltage driving type or a current driving type. When the mura compensation device is of the voltage driving type, each pixel comprises at least five TFTs and only the mura defects generated by the threshold voltage variations of the TFTs can be eliminated. When the mura compensation device is of the current driving type, each pixel comprises at least four TFTs. When the pixel is driven by low gray level, the performance of the current driving mura compensation device is bad. The mura compensation devices generally require many TFTs. The higher the amount of TFTs required, the lower the aperture ratio, so that the mura compensation devices cannot be applied to display panels with high resolutions, such as 2-inch QVGA systems. The mura compensation devices reduce the brightness of the pixels and enlarge the circuit size of the pixel array.

Another solution to mura defects is external compensation technique, such as that disclosed in U.S. Pat. No. 6,911, 781B2, which directly adjusts the gray levels according to reference data. However, U.S. Pat. No. 6,911,781B2 does not disclose techniques of collecting the reference data and does not disclose techniques of adjusting the gray level. Furthermore, U.S. Pat. No. 6,911,781B2 requires a large size for memory to store reference data.

To overcome the defects of the conventional techniques, a novel method for eliminating mura defects is called for, and novel image display systems are disclosed by the invention.

BRIEF SUMMARY OF THE INVENTION

The above and other advantages will become more apparent with reference to the following description taken in conjunction with the accompanying drawings.

The invention provides image display systems comprising techniques of collecting reference data and techniques of adjusting the gray levels. Compared to conventional pixel structures, no additional components are added to the pixel structure by this invention. Compared to U.S. Pat. No. 6,911, 781B2, the memory size of the invention is smaller than that required in U.S. Pat. No. 6,911,781B2. In addition to eliminating mura defects, display panels of the invention satisfy gamma factor settings, white point settings and peak brightness settings without additional adjusting processes required in conventional techniques.

The invention provides image display systems comprising a plurality of pixels, a memory, and an ASIC (Application-Specific Integrated Circuit). Each of the pixels relates to a mura compensation coefficient set. The memory stores the mura compensation coefficient sets of the pixels. The ASIC reads the mura compensation coefficient sets from the memory. With different mura compensation coefficient sets, the ASIC serves as different mura compensation function sets. Each mura compensation function set relates to one of the aforementioned pixels and is used for transforming an original gray level to a mura-eliminated gray level to drive the corresponding pixel.

The mura compensation coefficient sets are generated by a coefficient generator. The coefficient generator comprises a plurality of sensing units, an average brightness measuring instrument, and a processing unit. The sensing units sense the pixels and output sensed data of the pixels. The average brightness measuring instrument measures an average brightness of the pixels. Based on the average brightness, the processing unit transforms the sensed data into brightness data. The processing unit provides at least one test gray level to test the pixels. For each pixel, based on the relationship between the at least one test gray level and the corresponding brightness datum, the processing unit generates the mura compensation coefficient set for the pixel.

The mura defect is considerably reduced when compared to conventional methods and when driving the pixels by the mura-eliminated gray levels.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
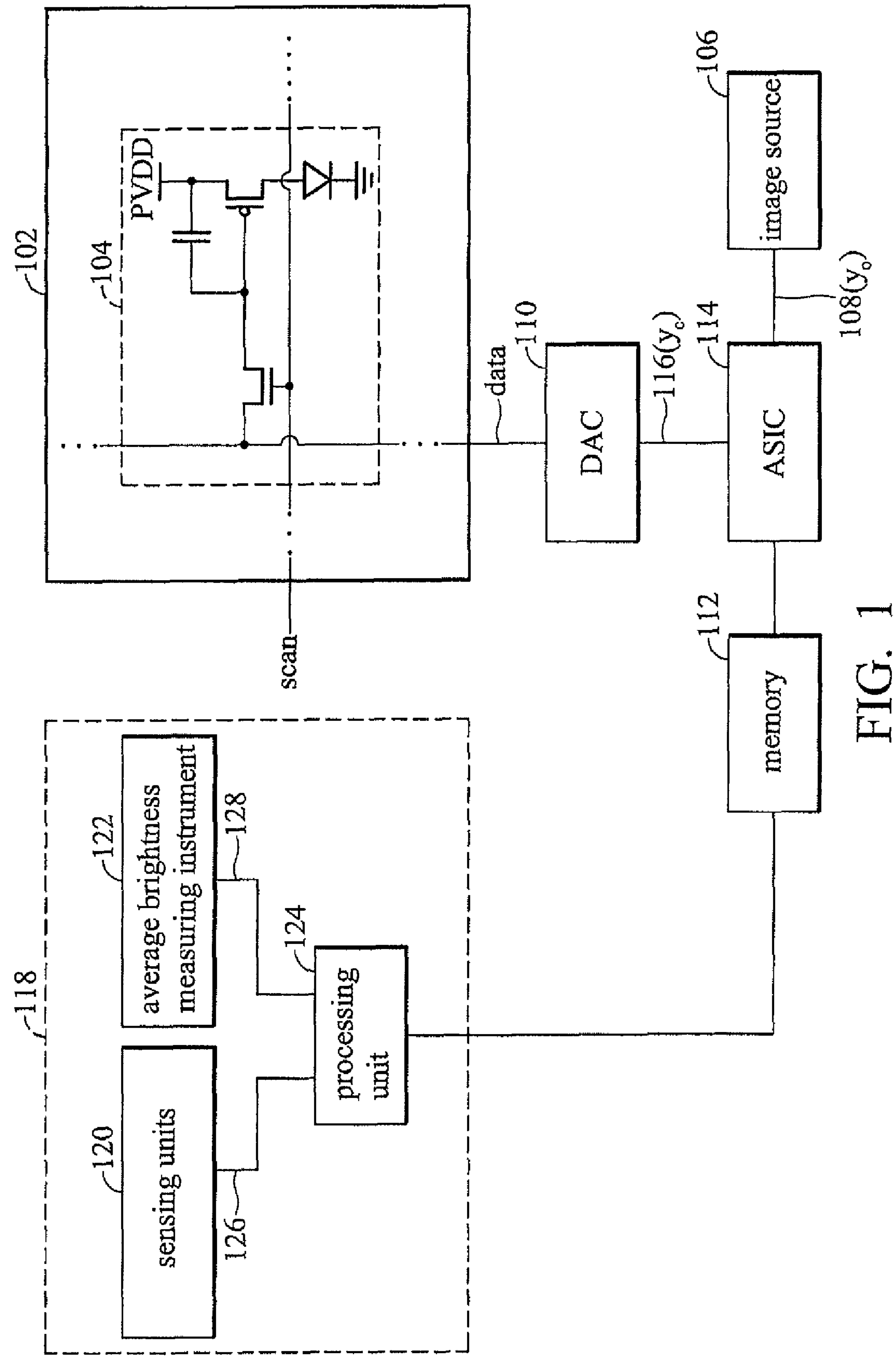
FIG. 1 illustrates an embodiment of the image display system of the invention.

FIG. 1 illustrates an embodiment of the image display system of the invention. As shown in FIG. 1, the image display system comprises a pixel array 102 comprising a plurality of pixels, wherein block 104 illustrates the structure of one of the pixels. When a scan line (Scan) activates the TFT of block 104 (through the gate of the TFT), the voltage value of a data line (data) is transported into the pixel. Referring to block 104, the pixel in this embodiment is 2T1C type. The invention is not limited to the pixel structure shown in block 104, and any pixel structures all can be applied to the invention.

To drive one pixel, conventional image display systems without mura compensation directly transport the original gray level 108 of the pixel from the image source 106 to the digital to analog converter (DAC) 110. The DAC 110 transforms the received data into a voltage value and transports the voltage value into the pixel via the data line (data). Compared to conventional image display systems, the image display system of the invention further comprises a memory 112 and an ASIC 114. In this invention, each of the pixels relates to a mura compensation coefficients set. The memory stores the mura compensation coefficient sets of all the pixels. To drive a pixel, the ASIC 114 reads the mura compensation coefficient set of the pixel from the memory 112. With the mura compensation coefficient set, the ASIC 114 serves as a mura compensation function set of the pixel and transforms an original gray level ($y_0$) of the pixel to a mura-eliminated gray level $y_c$, (or named mura-compensated gray level). Referring to FIG. 1, instead of inputting the original gray level signal $y_o$ to the DAC 110, the mura-eliminated gray level $y_c$ is inputted to the DAC 110. The DAC 110 transforms the mura-eliminated gray level $y_c$ to a voltage value and transports the voltage value into the pixel.

The mura compensation coefficient sets stored in the memory 112 are generated by a coefficient generator 118. The coefficient generator 118 comprises a plurality of sensing units (120) sensing the illumination of the pixels, an average brightness measuring instrument 122 (or named average luminance measuring instrument), and a processing unit 124. The sensing units 120 sense the pixels and output sensed datum of each pixel. The sensing units may be an array of charge coupled devices (CCDs), photomultiplier tubes or current meters. In an embodiment where an array of CCDs are implemented as the sensing units, the sensed data are not absolute values and are dependent on the exposure time of CCDs. In an embodiment where the sensing units are current meters, the sensed datum is the current flowing through the corresponding pixel. Because the sensed data are not the actual brightness (luminance) of the pixels, additional procedures are necessary to relate the sensed data to the actual brightness (luminance) of the pixels. The average brightness measuring instrument 122 is used for this propose; it measures the average brightness (luminance) of all pixels. Referring to FIG. 1, the sensed data of all pixels (126) and the average brightness (128, average luminance) are inputted to the processing unit 124. The processing unit 124 transforms the sensed data into brightness data (or luminance data, quantified by nits) based on the average brightness (average luminance). In the following description, the term "brightness" means "luminance".

The average brightness measuring instrument 122 may be a luminance meter. The sensed datum may be a gray level, number of photoelectrons, or average current of the corresponding pixel . . . . In some embodiments, the sensed datum is transformed into brightness datum by the following equation:

$$L=L_{AVG}\cdot(G/G_{AVG})^{r},$$

where L represents the brightness datum, $L_{AVG}$ represents the average brightness measured by the average brightness measuring instrument 122, G represents the sensed datum, $G_{AVG}$ represents the average value of all sensed data, and r represents a regulating factor which is set according to the linearity between the sensed data and the actual brightness generated by the corresponding pixel.

The processing unit 124 tests the pixels by at least one test gray level. For each pixel, the processing unit 124 analyzes the relationship between the at least one test gray level and the corresponding brightness datum to estimate the mura compensation coefficient set of the pixel.

The invention provides a plurality of algorithms describing the relationship between the test gray level and the brightness data. The mura compensation coefficient set is dependent on the algorithms and the design of the ASIC 114 is dependent on the algorithms.

Figure 2:
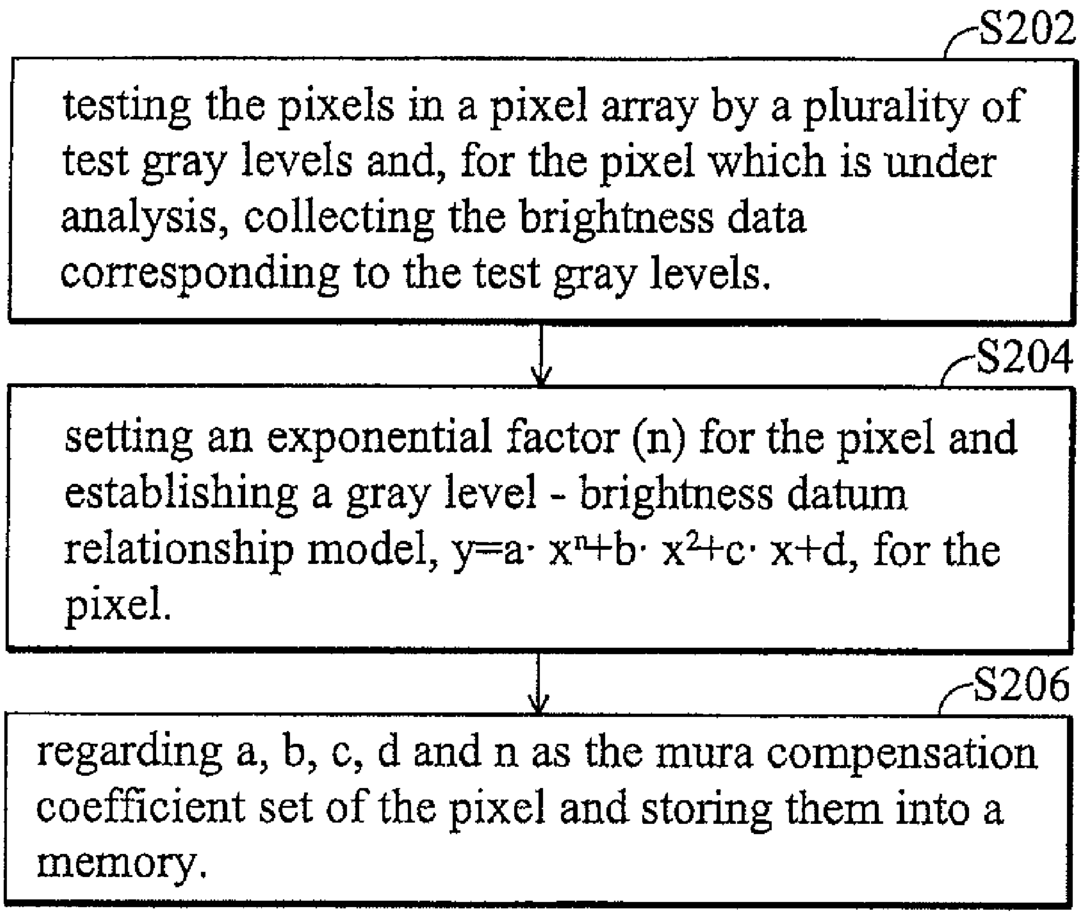
FIG. 2 is a flowchart describing an algorithm of the invention that generates a mura compensation coefficient set for a pixel.

FIG. 2 shows a flowchart of an algorithm of the invention that generates a mura compensation coefficient set for a pixel. In step S202, all pixels of a pixel array are tested by a plurality of test gray levels. For each pixel, the brightness data corresponding to the test gray levels are obtained. In step S204, an exponential factor n is set for each pixel according to a gamma factor γ of the corresponding pixel (in some embodiments, n=1/γ), and a gray level—brightness datum relationship model is generated for each pixel by curve fitting techniques based on the test result of step S202. The gray level—brightness datum relationship model is described by the following equation:

$$y=a\cdot x^{n}+b\cdot x^{2}+c\cdot x+d \quad \text{(eq. 1)}$$

where y represents the gray level actually driving the pixel, x represents the brightness datum corresponding to y, n represents the exponential factor of the pixel. The value of a, b, c and d are calculated by curve fitting techniques. In step S206, the value of a, b, c, d and n are stored into the memory 112 as the mura compensation coefficient set of the corresponding pixel.

In an embodiment where all pixels have the same gamma factor, all pixels have the same exponential factor. In a Quarter VGA system (QVGA, having a resolution of 320×240×4, wherein '4' are for subpixels R, G, B and W), in addition to the exponential factor n, the memory 112 further provides an array to store a, b, c and d of each pixel. The size of the array is 320×240×4×4.

In the QVGA system, the structure of the ASIC 114 is established based on equation 1. To drive a pixel, the ASIC 114 reads the mura compensation coefficient set (a, b, c, d and n) of the pixel from the memory 112 and serves as a mura compensation function set of the pixel. The mura compensation function set comprises:

$$x_e = L_{peak}\cdot\left(\frac{y_o}{255}\right)^{\gamma}, \text{ and} \quad \text{(eq. 2)}$$

$$y_c=a\cdot x_e^{\,n}+b\cdot x_e^{\,2}+c\cdot x_e+d \quad \text{(eq. 3)}$$

where $y_o$ represents an original gray level of the pixel, $L_{peak}$ and γ are set by the user (or the manufacture) and represent the peak brightness and the gamma factor of the pixel, respectively, and $x_e$ represents an expected brightness datum corresponding to $y_o$ while $L_{peak}$ and γ are satisfied. The mura compensation function set transforms the original gray level $y_o$ to a mura-eliminated gray level $y_c$, and the image display system of the invention drives the pixel by the mura-eliminated gray level $y_c$.

Figure 3:
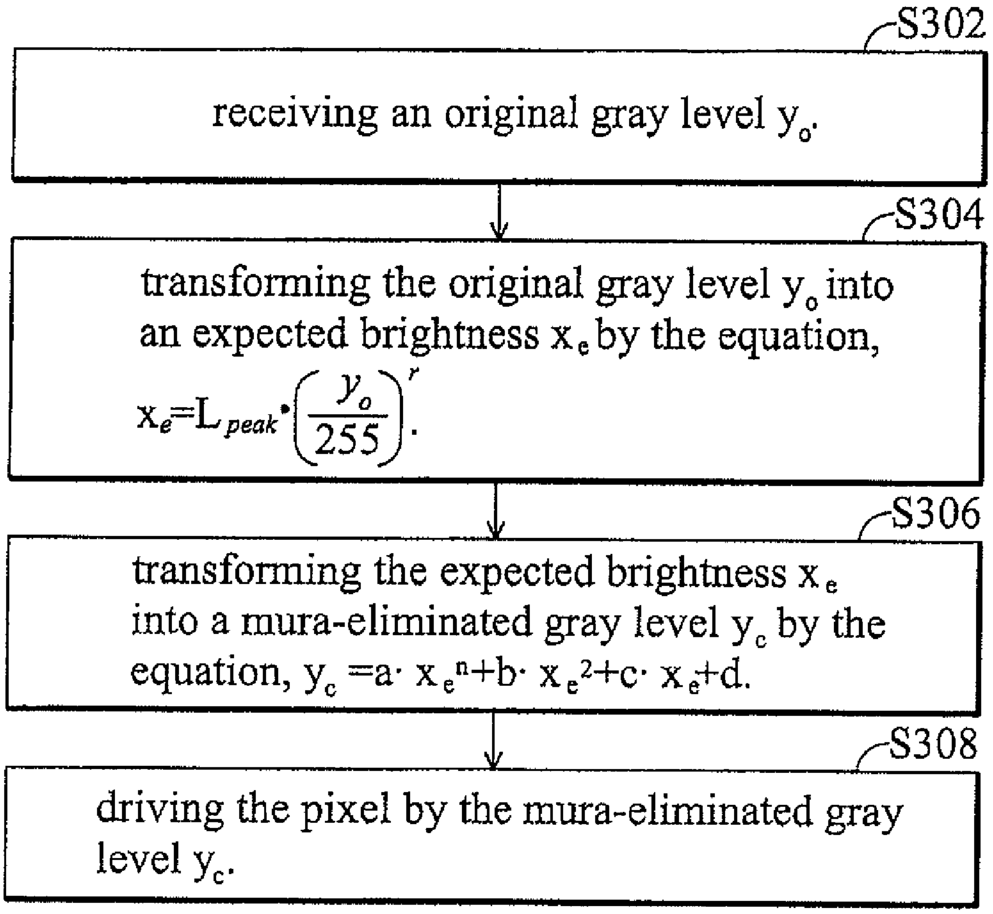
FIG. 3 is a flowchart describing how the ASIC of the invention drives a pixel.

FIG. 3 is a flowchart describing how the ASIC 114 drives a pixel. In step S302, the ASIC 114 receives an original gray level $y_o$. In step S304, the ASIC 114 transforms the original gray level $y_o$ into an expected brightness $x_e$ based on equation 2. In step S306, the ASIC 114 transforms the expected brightness $x_e$ into a mura-eliminated gray level $y_c$ based on equation 3. In step S308, the ASIC 114 outputs the mura-eliminated gray level $y_c$ to take the place of the original gray level $y_o$. The pixel is driven by the mura-eliminated gray level $y_c$.

Referring to the equation 2, the peak brightness $L_{peak}$ and the gamma factor γ set by the user or the manufacture are satisfied by the invention without additional procedure. In image display systems, a white point is dependent on the peak brightness of subpixels R, G and B. Because the invention can drive the subpixels to display the desired peak brightness, the white point is controllable in this invention. In some embodiments, the image display systems further comprises control terminals for $L_{peak}$ and γ, and the user can change the value of $L_{peak}$ and γ by the control terminals.

Figure 4:
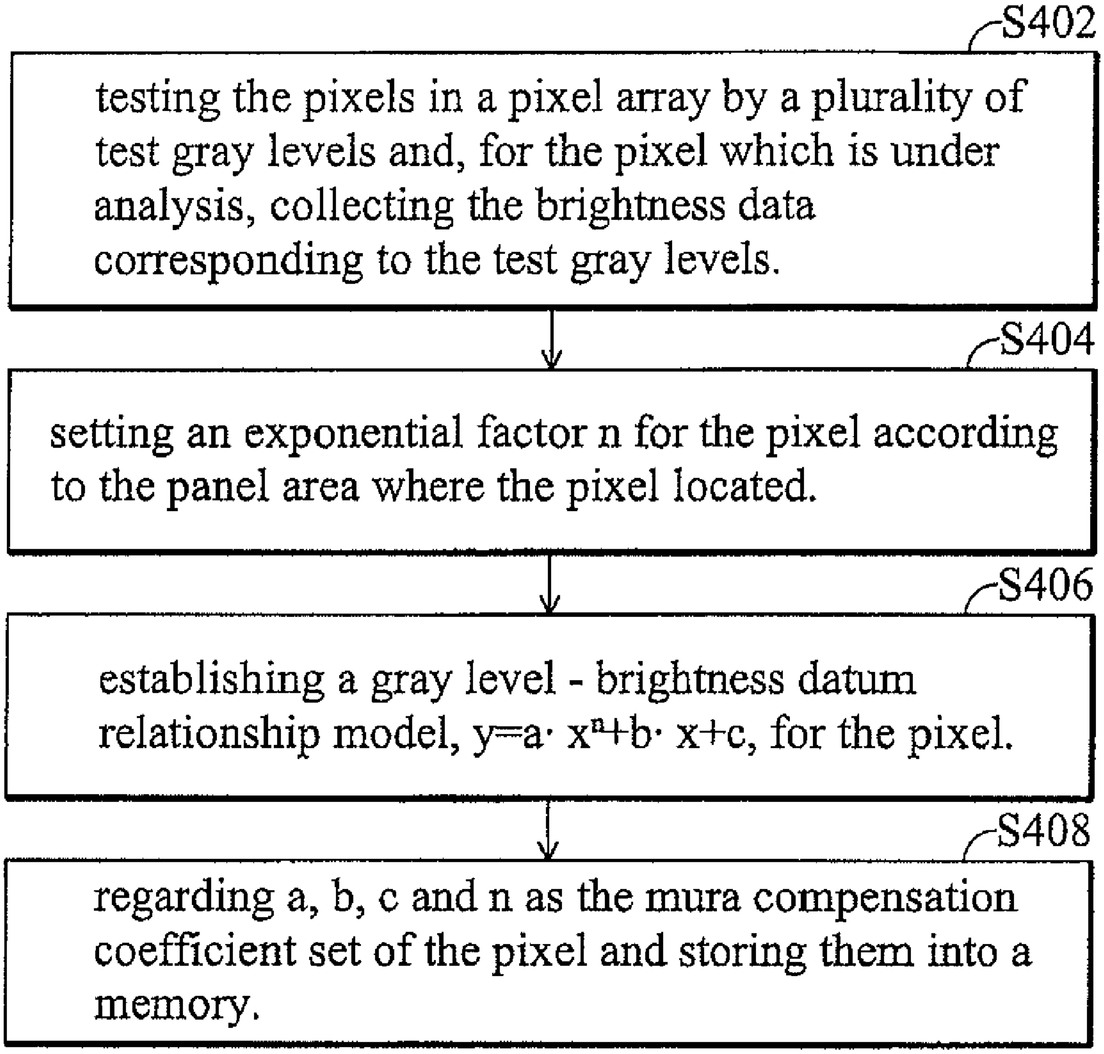
FIG. 4 is a flowchart describing another algorithm of the invention that generates the mura compensation function set of a pixel.

FIG. 4 is a flowchart showing another algorithm of the invention that generates the mura compensation function set of a pixel. In step S402, all pixels in the pixel array are tested by a plurality of test gray levels and, for each pixel, the brightness data corresponding to the test gray levels are obtained. The algorithm divides the pixel array into a plurality of regions according to the electronic characteristics of the pixels. The pixels in the same region are assigned the same exponential factor n. In step S404, the exponential factor n of the pixel is determined according to the region the pixel located. In step S406, a gray level—brightness datum relationship model is established for the pixel according to curve fitting techniques based on the result of step S402. The gray level—brightness datum relationship model is described by the following equation:

$$y=a\cdot x^n+b\cdot x+c \qquad \text{(eq. 4)}$$

where y represents the gray level actually driving the pixel, x represents the brightness datum corresponding to y, n represents the exponential factor of the pixel. a, b and c are calculated according to curve fitting techniques. a, b, c and n form the mura compensation coefficient set of the pixel and, in step S408, they are stored into the memory 112.

The most significant difference between equations 1 and 4 is the setting of the exponential factor n. Since there are voltage drops along the power lines, the luminance of each sub-pixels would change depending on their distance to the power line. Other inherent process variation or layout properties also cause a group of pixels having different luminance characteristics with the other. To improve the accuracy of the gray level—brightness datum relationship model and reduce the complexity of the model, the exponential factor n is set to be dependent on the illumination of the panel area where the pixel located. Comparing equation 1 with equation 4, equation 4 is simpler than equation 1. Each pixel only requires three mura compensation coefficients, a, b and c. Thus, the size of the memory 112 is dramatically reduced.

In an embodiment of the invention, the exponential factor is set by the following steps: dividing the pixel array into a plurality of regions according to the illumination of the pixels; sampling pixels in each region and estimating the exponential factors of the sampled pixels; averaging the estimated exponential factors of each region to get an average exponential factor of each region; and assigning the average exponential factor to all pixels in the corresponding region as the exponential factors of the pixels.

In a QVGA system, the memory 112 stores the exponential factors (n) of all regions and provides an array having a size of 320×240×4×3 to store a, b and c of the subpixels. Compared to the algorithm adopting equation 1, the algorithm adopting equation 4 requires less memory space.

In an embodiment adopting equation 4, the ASIC 114 is established according to equation 4. To drive a pixel, the ASIC reads the mura compensation coefficient set (a, b, c and n) of the pixel from the memory 112. After receiving the mura compensation coefficient set, the ASIC 114 serves as a mura compensation function set of the pixel. The mura compensation function set comprises:

$$x_e = L_{peak}\cdot\left(\frac{y_o}{255}\right)^{\gamma}, \text{ and} \qquad \text{(eq. 2)}$$

$$y_c=a\cdot x_e^{\,n}+b\cdot x_e+c \qquad \text{(eq. 5)}$$

where $y_o$ represents an original gray level of the pixel, $L_{peak}$ and γ are set by the user (or manufacture) and represent the peak brightness and the gamma factor of the pixel, respectively, and $x_e$ represents an expected brightness datum corresponding to $y_o$ while $L_{peak}$ and γ are satisfied. The mura compensation function set transforms the original gray level $y_o$ to a mura-eliminated gray level $y_c$, and the image display system of the invention drives the pixel by the mura-eliminated gray level $y_c$.

Figure 5:
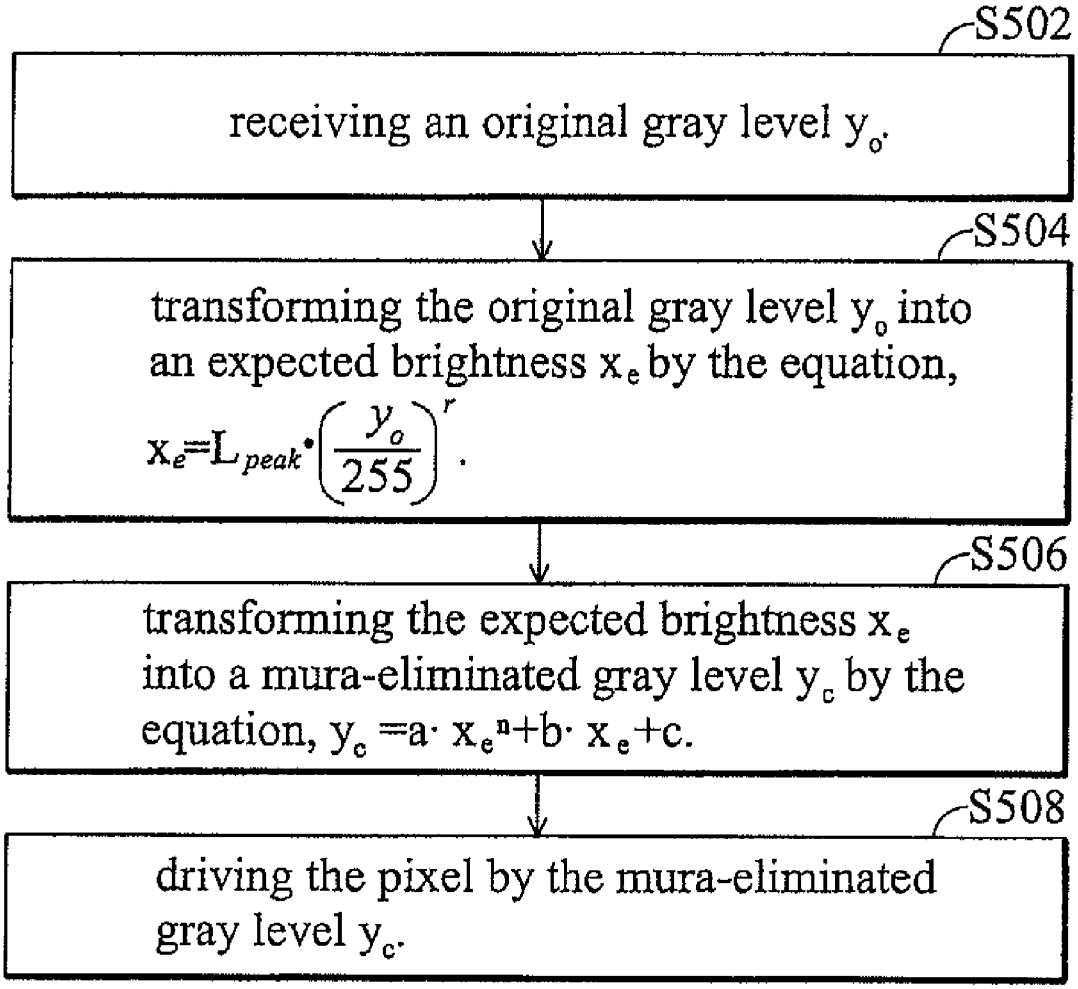
FIG. 5 is a flowchart describing how the ASIC of the invention drives a pixel.

FIG. 5 is a flowchart describing how the ASIC 114 drives a pixel. In step S502 the ASIC 114 receives an original gray level of the pixel ($y_o$). In step S504, the ASIC 114 transforms the original gray level $y_o$ to an expected brightness datum $x_e$ based on equation 2. In step S506, the ASIC 114 transforms the expected brightness datum $x_e$ to a mura-eliminated gray level $y_c$. In step S508, the ASIC 114 outputs the mura-eliminated gray level $y_c$ to take the place of the original gray level $y_o$. The pixel is driven by the mura-eliminated gray level $y_c$.

The peak brightness $L_{peak}$ and the gamma factor γ set by the user or the manufacture are satisfied by the invention because of equation 2. Furthermore, the white point of the image display system is controllable. In some embodiments, the image display systems further comprises control terminals for $L_{peak}$ and γ, and the user can change the value of $L_{peak}$ and γ by the control terminals.

Figure 6:
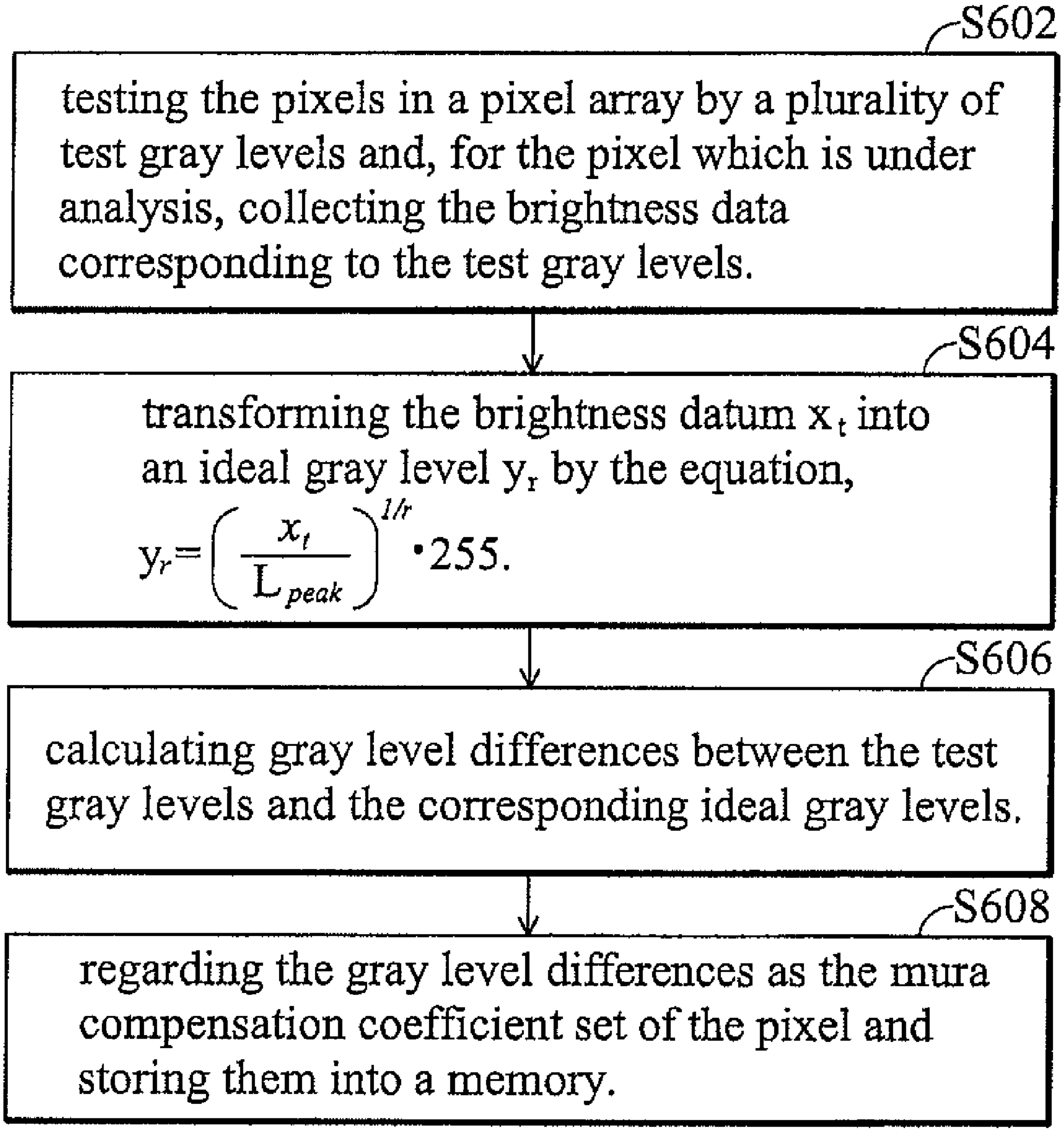
FIG. 6 is a flowchart describing another algorithm of the invention that generates the mura compensation coefficient set of a pixel.

FIG. 6 is a flowchart showing another algorithm of the invention that generates the mura compensation coefficient set of a pixel. In step S602, a plurality of test gray levels are provided to test all pixels of a pixel array and, for each pixel, the brightness data corresponding to the test gray levels are obtained. In step S604, the brightness datum is transformed to an ideal gray level by the following brightness datum—ideal gray level transformation:

$$y_r = \left(\frac{x_t}{L_{peak}}\right)^{\frac{1}{\gamma}}\cdot 255. \qquad \text{(eq. 6)}$$

where $x_t$ represents the brightness datum, $L_{peak}$ and γ are set by the user (or the manufacture) and represent the peak brightness and the gamma factor of the pixel, respectively, and $y_r$ represents the ideal gray level corresponding to $x_t$ while $L_{peak}$ and γ are satisfied. In step S606, the processing unit 124 calculates gray level differences between the test gray levels and the corresponding ideal gray levels. In step S608, for each pixel, the corresponding gray level differences are stored into the memory 112 as the mura compensation coefficient set of the pixel.

In the QVGA system where the pixels are tested by m test gray levels, the memory 112 comprises m arrays. The size of each array is 320×240×4.

Figure 7:
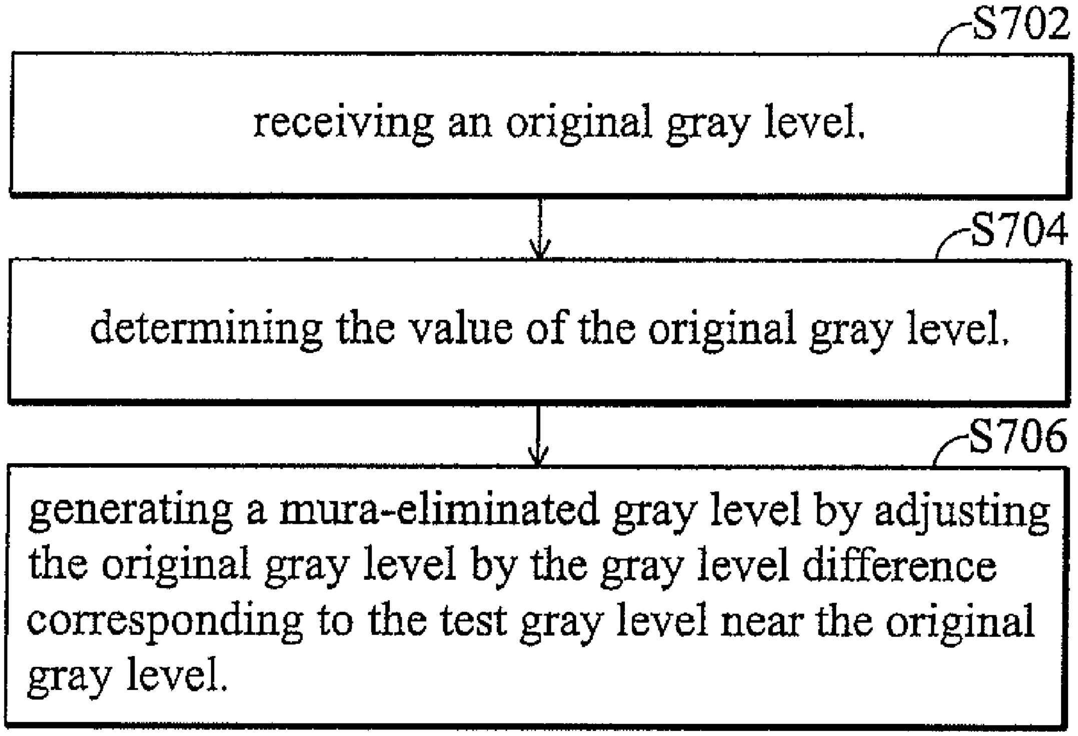
FIG. 7 is a flowchart describing how the ASIC of the invention drives a pixel.

In the embodiment adopting the algorithm shown in FIG. 6, the ASIC 114 further comprises an adder (or a subtracter). FIG. 7 shows a flowchart describing how the ASIC 114 drives a pixel. In step S702, the ASIC 114 receives an original gray level of the pixel. In step S704, the ASIC 114 determines the value of the original gray level. In step S706, the ASIC 114 generates a mura-eliminated gray level by adjusting the original gray level by the gray level difference corresponding to the test gray level near the original gray level. The mura-eliminated gray level $y_c$ takes the place of the original gray level $y_o$ and drives the pixel. The algorithm takes the peak brightness $L_{peak}$ and the gamma factor $\gamma$ into consideration when generating the mura compensation coefficient set.

Figure 8:
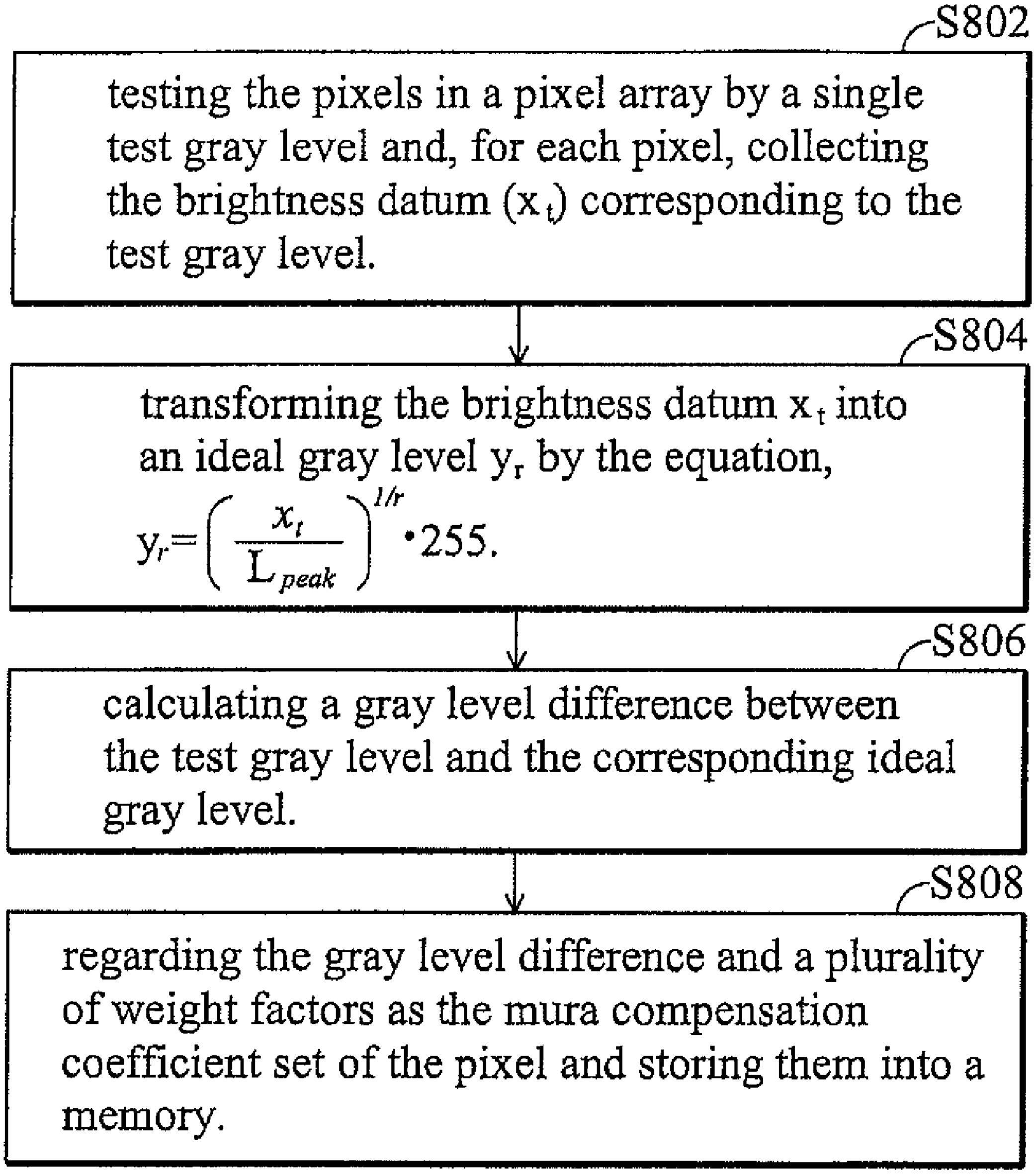
FIG. 8 is a flowchart describing another algorithm of the invention that generates the mura compensation coefficient set of a pixel.

The invention further provides algorithms to be applied to image display systems only having slight mura defects. FIG. 8 shows the flowchart of the algorithm. In step S802, only one test gray level is provided to test the pixels of a pixel array. In step S804, for the pixel under analysis, the brightness datum corresponding to the test gray level is transformed to an ideal gray level by the following brightness datum—ideal gray level transformation:

$$y_r = \left(\frac{x_t}{L_{peak}}\right)^{\frac{1}{\gamma}} \cdot 255. \quad \text{(eq. 6)}$$

where $x_t$ represents the brightness datum, $L_{peak}$ and $\gamma$ are set by the user (or the manufacture) and represent the peak brightness and the gamma factor of the pixel, respectively, and $y_r$ represents the ideal gray level corresponding to $x_t$ while $L_{peak}$ and $\gamma$ are satisfied. In step 806, the processing unit 124 calculates a gray level difference between the test gray level and the ideal gray level. In step S808, the gray level difference and a plurality of weight factors are regarded as the mura compensation coefficient set of the pixel and are stored into the memory 112.

In QVGA systems, in addition to the weight factors, the memory 112 provides an array having a size of 320×240×4. Compared to the algorithm shown in FIG. 6, the algorithm shown in FIG. 8 can use memories having smaller sizes.

Figure 9:
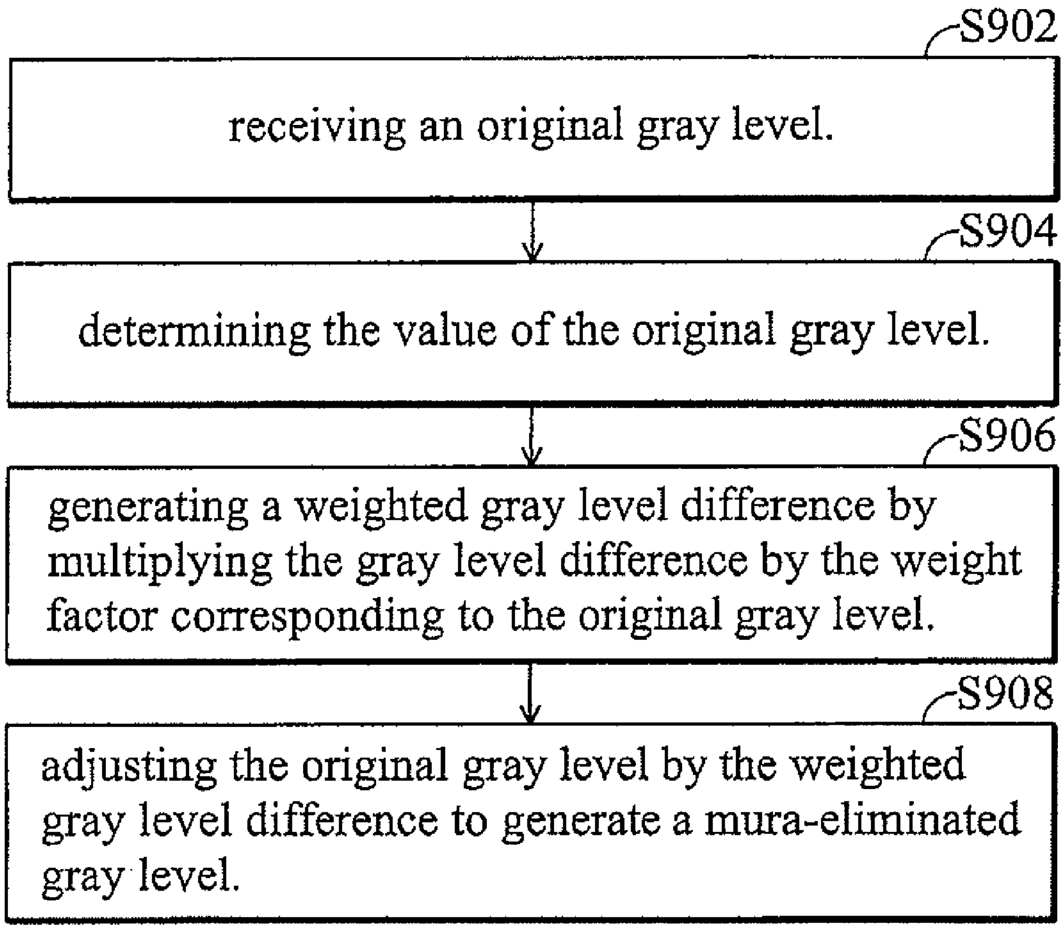
FIG. 9 is a flowchart describing how the ASIC of the invention drives a pixel.

In the embodiment adopting the algorithm shown in FIG. 8, the ASIC 114 further comprises an adder (or a subtracter). FIG. 9 shows a flowchart describing how the ASIC 114 drives a pixel. In step S902, the ASIC 114 receives an original gray level of the pixel. In step S904, the ASIC 114 determines the value of the original gray level. In step S906, the ASIC 114 gets a weighted gray level difference by multiplying the gray level difference by the weight factor corresponding to the value of the original gray level. In step S908, the ASIC 114 adjusts the original gray level by the weighted gray level difference to generate a mura-eliminated gray level. The mura-eliminated gray level takes the place of the original gray level and drives the pixel.

Figure 10:
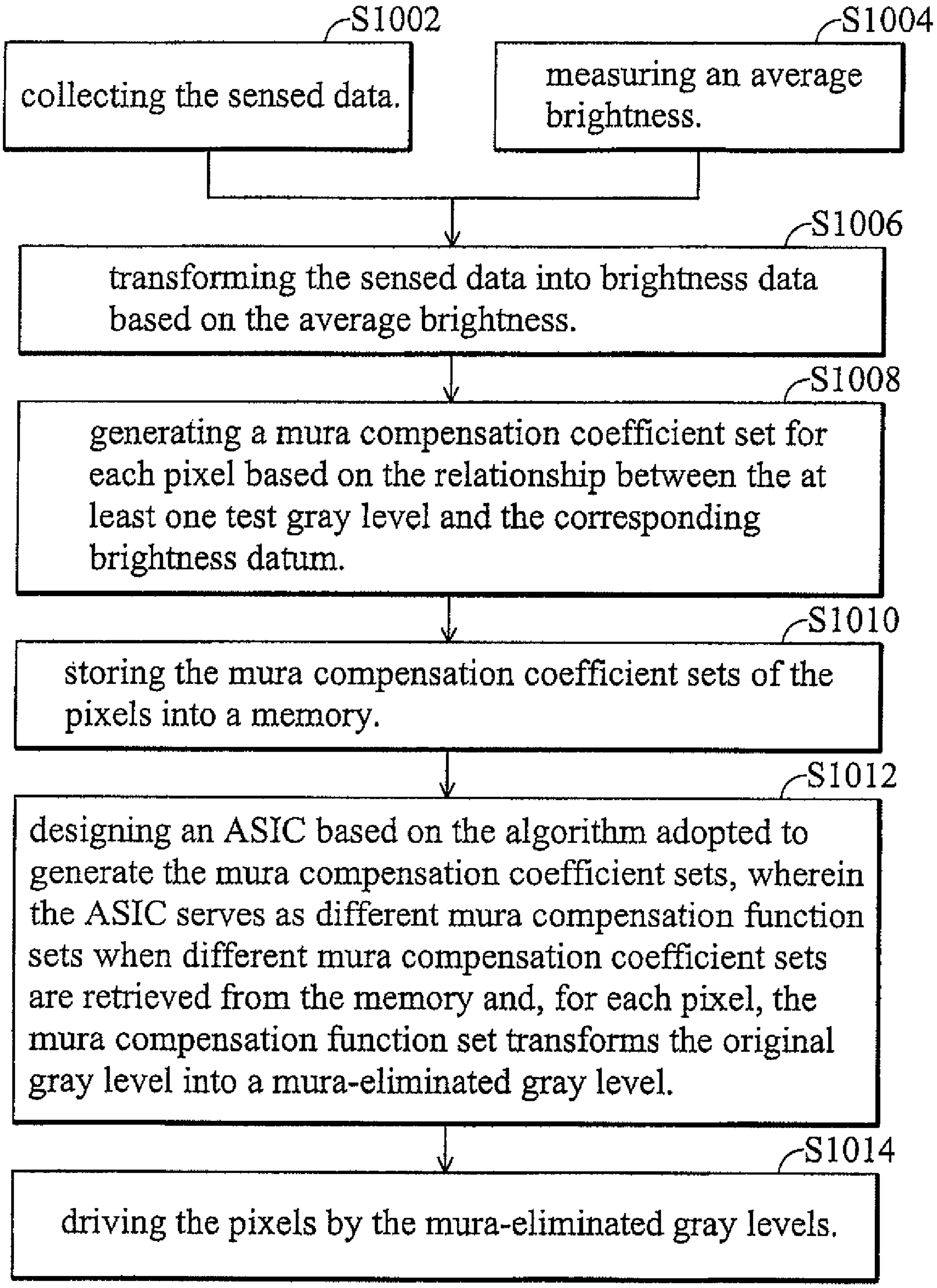
FIG. 10 is a flowchart of the method for eliminating mura defects of the invention.

FIG. 10 shows another embodiment of the invention. It is a flowchart of the method for eliminating mura defects. In step S1002, the invention provides a plurality of sensing units for a plurality of pixels of a pixel array to generate sensed data of the pixels. In step S1004, the invention provides an average brightness measuring instrument to measure an average brightness of the pixels. In step S1006, the invention provides a processing unit to transform the sensed data into brightness data based on the average brightness. In step S1008, the invention provides at least one test gray level to test the pixels, and generates a mura compensation coefficient set for each pixel according to the relationship between the test gray level and corresponding brightness datum. In step S1010, the invention stores the mura compensation coefficient sets of the pixels into a memory. In step S1012, the invention provides an ASIC constructed according to the algorithm adopted to generate the mura compensation coefficient sets. The ASIC retrieves the mura compensation coefficient sets from the memory and serves as different mura compensation function sets when different mura compensation coefficient sets are retrieved. For each pixel, the mura compensation function set is used for transforming an original gray level of the corresponding pixel to a mura-eliminated gray level. In step S1014, the invention drives the pixels by the mura-eliminated gray levels.

The invention can be applied to pixel arrays having pixels of the same type as well as pixel arrays having pixels of different types (such as full color display panels). In full color display panels, the pixels may be red, green, blue or white. Because the pixel data gathered in the invention are brightness data, the invention eliminates mura defects of full color display panels without additional compensation procedures.

Figure 11:
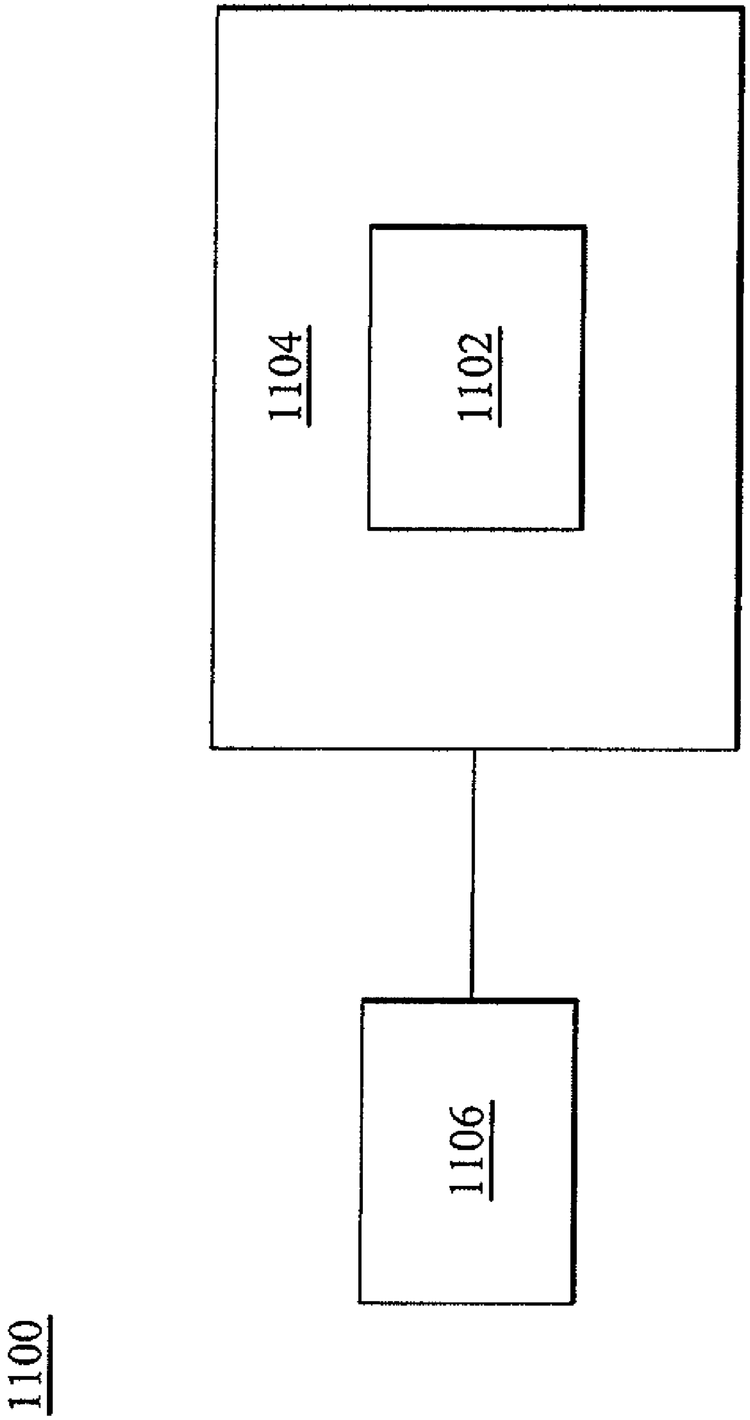
FIG. 11 illustrates an electronic device of the invention.

FIG. 11 illustrates an electronic device 1100, which comprises a pixel array 1102 (corresponding to the pixel array 102 in FIG. 1 as mentioned above), a display panel 1104 and an input terminal 1106. The pixel array 1102 may be an Active-Matrix organic Light Emitting Display (AMOLED) and comprises a plurality of pixels. In some embodiments, the display panel 1104 may comprises the DAC 110, the memory 112 and the ASIC 114 in FIG. 1 as mentioned above, and the coefficient generator 118 may be implemented in another computer system (outside from the electronic device 1100), such as a tester. For some other embodiments, instead of an external tester, the coefficient generator 118 may be implemented in the display panel 1104. The input terminal 1106 is coupled to the display panel 1104 to receive the images (such as the image source 106) to be displayed by the display panel 1104.

The electronic device 1100 is within the scope of the invention. The electronic device 1100 may be a cell phone, a digital camera, a personal digital assistant, a notebook, a desktop, a television, a car display panel, or a portable DVD player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. An image display system, comprising a plurality of pixels, each relating to a mura compensation coefficient set;

a memory, storing the mura compensation coefficient sets of the pixels; and an ASIC, retrieving the mura compensation coefficient sets from the memory and forming different mura compensation function sets with different mura compensation coefficient sets, wherein each mura compensation function set is used for transforming an original gray level of the corresponding pixel to a mura-compensated gray level that is used in driving the pixel;

wherein the mura compensation coefficient sets are generated by a coefficient generator comprising:

a plurality of sensing units, sensing the pixels and outputting sensed data;

an average luminance measuring instrument, measuring average luminance of all of the pixels; and a processing unit, transforming the sensed data to luminance data based on the average luminance, wherein the luminance datum and the sensed datum follow the following equation:

$$L=L_{AVG}\cdot(G/G_{AVG})^r,$$

where:

L represents the luminance datum, $L_{AVG}$ represents the average luminance of all of the pixels, G represents the sensed datum, $G_{AVG}$ represents the average value of the sensed data of all pixels, and r represents an adjusting factor, dependent on a sensed data—actual luminance linearity;

wherein the processing unit provides at least one test gray level to test the pixels and generate the mura compensation coefficient set of each pixel according to the relationship between the test gray level and the corresponding luminance datum.

2. The system as claimed in claim 1, wherein the processing unit tests the pixels by more than one test gray level and collects the corresponding luminance data to generate a gray level—luminance datum relationship model for each pixel.

3. The system as claimed in claim 2, wherein each mura compensation function set comprises an original gray level—expected luminance transformation, $$x_e = L_{peak}\cdot\left(\frac{y_o}{255}\right)^{\gamma},$$

where $y_o$ represents the original gray level, $L_{peak}$ represents a peak luminance, γ represents a gamma coefficient, and $x_e$ represents an expected luminance corresponding to $y_o$ while $L_{peak}$ and γ are satisfied.

4. The system as claimed in claim 3, wherein each gray level—luminance datum relationship model is described by the following equation:

$$y=a\cdot x^n+b\cdot x^2+c\cdot x+d,$$

where y represents the gray level actually driving the pixel, x represents the luminance datum corresponding to y, n represents an exponential factor, dependent on γ, and a, b, c, d and n form the mura compensation coefficient set of the pixel.

5. The system as claimed in claim 4, wherein each mura compensation function set further comprises an expected luminance—mura-compensated gray level transformation, $y_c=a\cdot x_e^n+b\cdot x_e^2+c\cdot x_e+d$, where $y_c$ represents the mura-compensated gray level corresponding to $x_e$.

6. The system as claimed in claim 3, wherein the each gray level—luminance datum relationship model is described by the following equation:

$$y=a\cdot x^n+b\cdot x+c,$$

where y represents the gray level actually driving the pixel, x represents the luminance datum corresponding to y, n represents an exponential factor, dependent on the illumination of the panel area the pixel located, and a, b, c and n form the mura compensation coefficient set of the pixel.

7. The system as claimed in claim 6, wherein each mura compensation function set further comprises an expected luminance—mura-compensated gray level transformation, $y_c=a\cdot x_e^n+b\cdot x_e+c$, where $y_c$ represents the mura-compensated gray level corresponding to $x_e$.

8. The system as claimed in claim 1, further comprising a display panel, comprising the pixels, the memory and the ASIC.

9. The system as claimed in claim 8, further comprising an electronic device, comprising:

the display panel; and an input unit, coupled to the display panel to receive images to be displayed by the display panel.

10. The system as claimed in claim 9, wherein the electronic device is a cell phone, a digital camera, a personal digital assistant, a notebook, a desktop, a television, a car display panel, or a portable DVD player.

11. A method for compensating mura defect, comprising:

providing a plurality of sensing units for a plurality of pixels of a pixel array to generate sensed data of the pixels;

providing an average luminance measuring instrument to measure an average luminance of all of the pixels;

providing a processing unit, transforming the sensed data to luminance data based on the average luminance, wherein the luminance datum and the sensed datum follow the following equation:

$$L=L_{AVG}\cdot(G/G_{AVG})^r,$$

where:

L represents the luminance datum, $L_{AVG}$ represents the average luminance of all of the pixels, G represents the sensed datum, $G_{AVG}$ represents the average value of the sensed data of all pixels, and r represents an adjusting factor, dependent on a sensed data—actual luminance linearity;

providing at least one test gray level to test the pixels and generate a mura compensation coefficient set for each pixel according to the relationship between the test gray level and the corresponding luminance datum;

storing the mura compensation coefficient sets into a memory;

providing an ASIC to retrieve the mura compensation coefficient sets from the memory and form different mura compensation function sets with different mura compensation coefficient sets, wherein each mura compensation function set is used for transforming an original gray level of the corresponding pixel to a mura-compensated gray level; and driving the pixels by the mura-compensated gray levels.

12. The method as claimed in claim 11, further comprising testing the pixels by more than one test gray level and collecting the corresponding luminance data to generate a gray level—luminance datum relationship model for each pixel.

13. The method as claimed in claim 12, wherein each gray level—luminance datum relationship model is described by the following equation:

$$y=a\cdot x^n+b\cdot x^2+c\cdot x+d,$$

where y represents the gray level actually driving the pixel, x represents the luminance datum corresponding to y, n represents an exponential factor, dependent on a gamma factor, and a, b, c, d and n form the mura compensation coefficient set of the pixel.

14. The method as claimed in claim 13, wherein each mura compensation function set comprises an original gray level—expected luminance transformation, $$x_e = L_{peak} \cdot \left(\frac{y_o}{255}\right)^{\gamma},$$

where $y_o$ represents the original gray level, $L_{peak}$ represents a peak luminance, $\gamma$ represents the gamma coefficient, and $x_e$ represents an expected luminance corresponding to $y_o$ while $L_{peak}$ and $\gamma$ are satisfied.

15. The method as claimed in claim 14, wherein each mura compensation function set further comprises an expected luminance—mura-compensated gray level transformation, $y_c = a \cdot x_e^{\,n} + b \cdot x_e^{\,2} + c \cdot x_e + d$, where $y_c$ represents the mura-compensated gray level corresponding to $x_e$.

16. The method as claimed in claim 12, wherein the each gray level—luminance datum relationship model is described by the following equation:

$$y = a \cdot x^n + b \cdot x + c,$$

where

- y represents the gray level actually driving the pixel,
- x represents the luminance datum corresponding to y,
- n represents an exponential factor, dependent on the illumination of the panel area the pixel located, and
- a, b, c and n form the mura compensation coefficient set of the pixel.

17. The method as claimed in claim 16, wherein the exponential factor is set by:

- dividing the pixel array into a plurality of regions according to the luminance of the pixels;
- sampling pixels in each region and estimating the exponential factors of the sampled pixels;
- averaging the estimated exponential factors in each region to get an average exponential factor of each region; and
- assigning the average exponential factor to all pixels in the corresponding region as the exponential factors of the pixels.

18. The method as claimed in claim 16, wherein each mura compensation function set comprises an original gray level—expected luminance transformation, $$x_e = L_{peak} \cdot \left(\frac{y_o}{255}\right)^{\gamma},$$

where $y_o$ represents the original gray level, $L_{peak}$ represents a peak luminance, $\gamma$ represents the gamma coefficient, and $x_e$ represents an expected luminance corresponding to $y_o$ while $L_{peak}$ and $\gamma$ are satisfied.

19. The method as claimed in claim 18, wherein each mura compensation function set further comprises an expected luminance—mura-compensated gray level transformation, $y_c = a \cdot x_e^{\,n} + b \cdot x_e + c$, where $y_c$ represents the mura-compensated gray level corresponding to $x_e$.

20. The method as claimed in claim 11, further comprising executing a luminance datum—ideal gray level transformation, $$y_r = \left(\frac{x_t}{L_{peak}}\right)^{\frac{1}{\gamma}} \cdot 255,$$

where $x_t$ represents the luminance datum, $L_{peak}$ and $\gamma$ represent a peak luminance and a gamma factor of the corresponding pixel, respectively, and $y_r$ represents an idea gray level corresponding to $x_t$ while $L_{peak}$ and $\gamma$ are satisfied.

21. The method as claimed in claim 20, further comprising testing the pixels by more than one test gray level and, for each pixel, calculating gray level differences between the test gray levels and the corresponding ideal gray levels and regarding the gray level differences as the mura compensation coefficient set of the corresponding pixel.

22. The method as claimed in claim 21, wherein the behavior of the mura compensation function set further comprises:

- determining the value of the original gray level of the corresponding pixel to find out the test gray level near the original gray level; and
- adjusting the original gray level by the gray level difference corresponding to the test gray level to get the mura-compensated gray level.

23. The method as claimed in claim 20, further comprising calculating a gray level difference between the test gray level and the ideal gray level for each pixel, and regarding the gray level difference and a plurality of weight factors as the mura compensation coefficient set of the corresponding pixel.

24. The method as claimed in claim 23, wherein the behavior of the mura compensation function set further comprises:

- determining the value of the original gray level of the corresponding pixel to find out the weight factor corresponding to the original gray level;
- multiplying the gray level difference by the weight factor to get a weighted gray level difference; and
- adjusting the original gray level by the weighted gray level difference to get the mura-compensated gray level.

* * * * *